May 5, 1964
R. LAWSON
3,131,663
APPARATUS FOR POSITIONING WORKPIECES
Filed Jan. 26, 1961
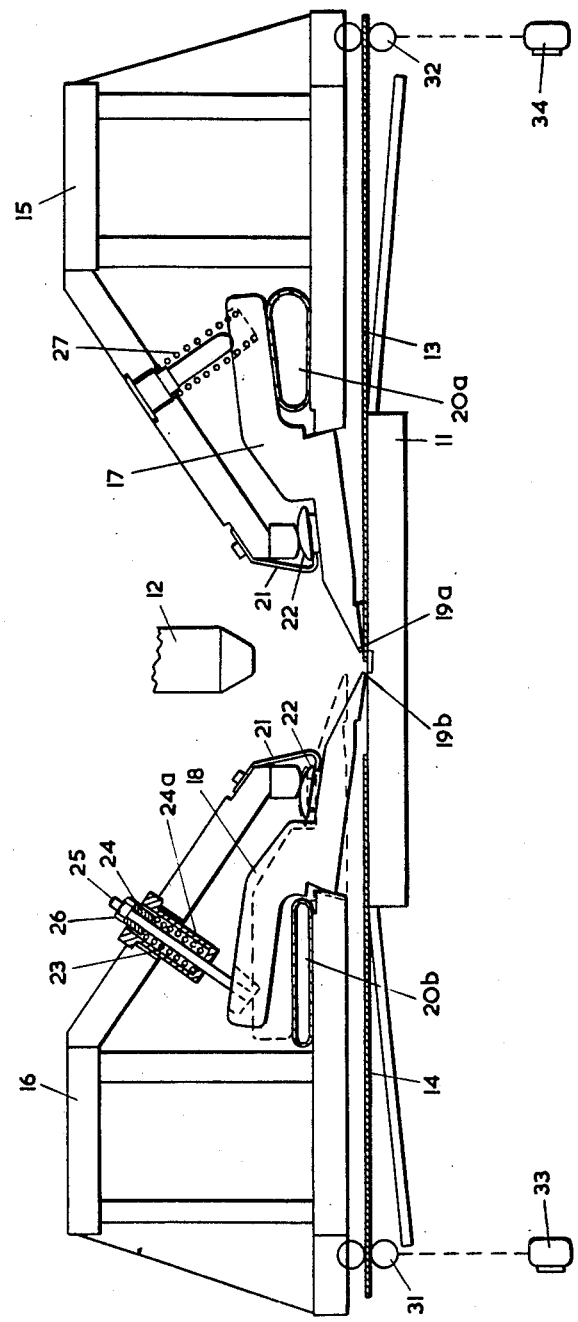
INVENTOR
*Robert Lawson*
BY *Aaron R. Townshend*
ATTORNEY.

3,131,663
APPARATUS FOR POSITIONING WORKPIECES
Robert Lawson, Newcastle-upon-Tyne, England, assignor to The British Oxygen Company Limited, a British company
Filed Jan. 26, 1961, Ser. No. 85,148
Claims priority, application Great Britain Jan. 28, 1960
1 Claim. (Cl. 113—131)

This invention relates to apparatus for positioning workpieces of thin material in butting relationship preparatory to welding by an arc welding process from one side of the workpiece. In many manufacturing processes involving a sequence of operations, in which arc welding is one operation carried out repeatedly on successive workpieces as they arrive at an arc-welding station, the matter of positioning the workpieces accurately in relation to the welding head presents some difficulty. In particular, where the workpieces to be joined by a butt weld are located by the method of feeding one workpiece to butt against another workpiece which is already in position, the problem arises with workpieces of thin material that the second workpiece does not butt accurately against the first but "rides up" over it. This may lead to a defective weld if not detected, or the continuous process may have to be stopped so that the fault in positioning of the workpiece may be rectified, the workpieces being accurately butted by hand before the welding operation can take place.

It will be apparent that this difficulty of overlapping of the workpieces to be welded will arise with increasing frequency as the thickness of the material to be welded is reduced.

It is an object of the present invention to provide improved apparatus for locating workpieces of thin material prior to welding.

According to the present invention apparatus for locating workpieces of thin material in butting relationship prior to welding, of the type having clamping means to hold a workpiece in a welding position against a backing member and feeding means arranged to feed a second workpiece to butt against a first workpiece already in the welding position, includes one or more guiding members arranged to exert, on the end portion of the second workpiece which is about to be welded, pressure to urge the second workpiece against the backing member during the feeding of the second workpiece towards the first workpiece.

The clamping means may comprise beams which hold the workpieces against the backing member and which extend across the workpiece substantially parallel to the edges to be welded, or may comprise finger-like elements arranged at intervals across the workpieces which similarly exert a pressure on the workpiece, holding them against the backing member. In the case of a narrow workpiece, one finger-like element may suffice. The clamping means may also act as the guiding member, and in this case the beams or one or more of the fingers acting on the second workpiece are controlled so that a guiding pressure smaller in magnitude than the clamping pressure can be applied to the second workpiece as it is fed into position. This guiding pressure is adjusted in magnitude for a given thickness and springiness of workpiece so as to be sufficient to prevent the second workpiece "riding up" and overlapping the first workpiece instead of butting against it, but is not so great as to noticeably increase the friction encountered when feeding the second workpiece into position. Conveniently, the fingers may be biassed towards the workpiece to provide this guiding pressure by means of a tension, compression, or leaf spring.

Alternatively the guiding members may be completely independent of the clamping means, and may comprise one or more guide wheels or finger-like elements such as strips of metal which are biassed towards the workpiece that is being fed into the welding position. This biassing action provides a guiding pressure on the moving workpiece and may be applied to the guide wheel or strip of metal by means of tension or a compression spring suitably mounted, hydraulically, pneumatically, or by a lever or cam operated by hand.

The present invention is applicable both to the uniting by welding of two entirely separate workpieces of thin material and to the fabrication of open-ended cylinders from rectangles of thin sheet metal formed into cylindrical shape, in which two opposite edges are then welded together to form a longitudinal seam in the completed cylinder. In this latter case the two workpieces will be constituted by the longitudinal strip portions of the cylindrical vessel adjacent to and terminating in the edges which are to be joined by a longitudinal weld.

As has been indicated, the invention is applicable to apparatus for joining workpieces of thin material, and in general by "thin material" is meant material having a thickness of from 0.008 inch to 0.030 inch. However, it will be apparent that the invention will be useful in dealing with material having a thickness outside this range if the material is such that the problem of "riding up" occurs when workpieces of the material are brought into butting relationship as hereinbefore described.

In order that the invention may be fully understood, a specific example of apparatus for locating workpieces prior to welding in accordance with the invention will now be described.

The apparatus forms part of an assembly designed for joining thin strips of metal to each other by a transverse weld to form a longer strip. This assembly is more fully described in our co-pending patent application No. 48,985 and it is sufficient for the present purpose to explain that in this welding apparatus the strips to be joined are fed longitudinally until they are butted beneath the welding head, then welded, and then the strip is run forward until the rearmost end is in position ready to be welded to another length of strip.

The drawing accompanying this specification shows a section through apparatus for locating workpieces of thin material prior to welding, the section being taken in a vertical plane at right angles to the line of the eventual welded joint to be formed. In this instance, and in general, the welded joint to be formed is a horizontal weld seam between horizontally-arranged butted thin metal strips, sheets, or plates, but it can be seen that the invention is not limited in its application to this orientation of the workpieces.

The apparatus embodying the invention comprises a backing member 11 situated beneath a transversely movable welding head 12, and at either side of this backing member are a pair of feed rolls 31 and 32 on which the thin metal strips 13, 14 may be moved longitudinally. The metal strips are moved by these feed rolls into and out of the welding position when the feed rolls are driven by the electric motors diagrammatically represented at 33 and 34. Located one at each side of the backing member are two frame structures 15, 16 which are arranged so as not to impede the travel of the thin metal strips to and from the welding position. Clamping means 17, 18 which include bearing surfaces 19a, 19b, and a first operating mechanism 20a, 20b, are attached to these frame structures, and are arranged so that operation of the mechanism causes the bearing surface to exert a clamping pressure forcing the thin metal strips against the backing member 11. In this instance, the clamping means take the form of finger-like elements 17, 18 each attached to the frame structure by springy strips 21 and each having a stud with a rounded head 22 engaging the frame structure so that the finger-like elements can pivot with respect to the frame structure. One end of each finger-like element 17, 18 rests on an inflatable pneumatic hose 20a, 20b and inflation of these hoses cause each finger to pivot about the point of engagement of the stud 22 with the frame structure and thus causes the bearing surfaces 19a and 19b to press the thin metal strips 13 and 14 respectively against the backing member 11

In the preferred arrangement according to the invention, here illustrated, one of the clamping finger-like elements also acts as the guiding member, and is therefore attached to the frame structure 16 by a second operating mechanism including a compression spring 23. When the hose is not inflated the spring 23 urges the collar 24 (which is a sliding fit in housing 24a) and rod 25 attached thereto in an upward direction and thus causes the finger-like element 18 to press lightly against the backing bar 11. The nut 26 may be adjusted on the rod 25 to vary the pressure which is exerted by the finger-like element 18; or alternatively the point of attachment of the rod 25 to the element 18 may be altered for this purpose. Thus when the second strip of thin material 14 is fed into the welding position by the feeding means 31 to butt against a first strip 13 which is already clamped in position, it is held against the backing member by this light pressure and consequently butts truly against the first strip and does not overlap it. In this embodiment, the springs are provided only on those clamping means (18 in the drawing) on the side of the backing member from which the second thin strip of metal is fed. In general, the finished welded strip will always be run off the machine in the same direction, i.e. towards a final coiling machine (not shown) in the direction of the arrow A, but if the feed of strip is likely to take place from either direction then a second operating mechanism including for example a compression spring or springs must obviously also be provided on clamping means 17. The compression spring 27 shown in the drawing acts to hold the finger-like element 17 away from the backing member 11 until the hose 20 is inflated so that positioning of the first workpiece is facilitated.

The pressure applied by the guiding members may be adjusted, as hereinbefore described, in order to take account of variations in thickness or springiness of the metal strip being welded.

In alternative embodiments the guiding member or members may be separate from and independent of the clamping means, and may consist of finger-like devices or guide wheels which are attached directly or indirectly to the frame structure and are actuated by a spring, hydraulically, pneumatically, by a lever or cam operated manually to exert a pressure on the thin metal strip as it is fed into the welding position. In all cases function of the guiding member or members is to hold the strip flat against the backing member so that it butts accurately against the strip already in position.

As previously mentioned, the invention may be applied to apparatus for the welding of the longitudinal seam of a thin-walled cylindrical vessel. In this application, the apparatus comprises a cantilever backing bar stake projecting horizontally from a main supporting structure which may be attached to the workshop floor. A trackway is provided adjacent to the backing bar stake and parallel to it. This trackway is adapted to guide the travel of an automatic welding machine of any suitable type and is arranged so that the path of travel of the welding head is over the centre of the backing bar. Clamping means are provided above and on either side of the backing bar in an analogous position to those in the apparatus for continuously joining thin strips of metal. The cylinders are loaded onto this backing stake which acts as a mandrel and a retractable stop is provided beneath the line of travel of the welding head. One longitudinal edge of the partly-formed cylinder is brought under one set of clamping means, butted against this retractable stop, and then clamped. The retractable stop is then retracted so that it offers no obstruction to the second edge of the partly-formed cylinder. The second set of clamping means are fitted with guiding members according to the invention and the second edge of the partly-formed cylinder is then brought under these guiding members and butted against the edge already in the welding position. The second set of clamping means are then operated to hold the cylinder firmly in position for the longitudinal seam thus formed to be closed by welding. On completion of the welding operation the clamping pressure is released and the cylinder withdrawn from the mandrel.

I claim:

Apparatus for locating workpieces of relatively thin material in abutting edge to edge relationship prior to welding, comprising in combination a workpiece supporting backing member, first and second frame structure disposed above said backing member, first clamping means mounted on said first frame and movable between clamping and nonclamping positions with respect to said backing member, means normally biasing said first clamping means away from said clamping position, first clamp actuating means mounted on said first frame for moving said clamping means toward said clamping position, feeding means for moving a first workpiece between said first clamping means and said backing member, second clamping means mounted on said second frame and movable between clamping and nonclamping positions with respect to said backing member, means normally biasing said second clamping means toward said clamping position, second clamp actuating means mounted on said second frame for moving said clamp into clamping position, feeding means for moving a second workpiece between said second clamping means and said backing means and into contact with said first workpiece, said second workpiece engaging said second clamping means and urging said second clamp means away from said backing member, means actuating said first and second clamp actuating means to urge said clamping means into clamping position whereby to hold said first and second workpieces in contact with each other and with said backing member, and welding means for joining said first and second workpieces together at their point of contact.

References Cited in the file of this patent
UNITED STATES PATENTS

| | | |
|---|---|---|
| 876,908 | Ljunglof | Jan. 14, 1908 |
| 2,371,376 | Bisbee | Mar. 13, 1945 |
| 2,393,198 | Somerville | Jan. 15, 1946 |
| 2,518,086 | Snorek | Aug. 8, 1950 |
| 2,607,310 | Evans | Aug. 19, 1952 |
| 2,908,205 | Fruman et al. | Oct. 13, 1959 |
| 2,922,870 | Collins et al. | Jan. 26, 1960 |
| 2,941,491 | Knost | June 21, 1960 |